United States Patent [19]

Saruyama

[11] Patent Number: 4,847,228

[45] Date of Patent: Jul. 11, 1989

[54] PLATINUM-ALKENYLSILOXANE COMPLEX CATALYST COMPOSITION

[75] Inventor: Toshio Saruyama, Chiba, Japan

[73] Assignee: Toray Silicone Co., Ltd., Tokyo, Japan

[21] Appl. No.: 256,827

[22] Filed: Oct. 12, 1988

Related U.S. Application Data

[63] Continuation-in-part of Ser. No. 56,821, Jun. 2, 1987, abandoned.

[51] Int. Cl.$^4$ .................... B01J 31/00; B01J 31/28
[52] U.S. Cl. ................... 502/158; 502/152; 528/15; 528/31; 528/32; 556/9; 556/12; 556/479
[58] Field of Search ............ 502/152, 158; 528/15, 528/31, 32; 556/479, 9, 12

[56] References Cited

U.S. PATENT DOCUMENTS

| | | | |
|---|---|---|---|
| 3,419,593 | 12/1968 | Willing | 556/479 |
| 3,541,126 | 11/1970 | Bardnnier | 556/9 |
| 3,914,199 | 10/1975 | Lee et al. | 524/361 |
| 4,288,345 | 9/1981 | Ashby et al. | 502/158 |
| 4,398,010 | 8/1983 | Adkins | 55/9 |
| 4,427,574 | 1/1984 | Pierpoint | 502/158 |
| 4,600,484 | 7/1986 | Drahnak | 502/152 |
| 4,642,265 | 2/1987 | Suzuki | 524/408 |
| 4,647,679 | 3/1987 | Panster et al. | 556/9 |
| 4,677,161 | 6/1987 | Suzuki et al. | 524/861 |
| 4,683,320 | 7/1987 | Hida et al. | 556/456 |
| 4,705,765 | 11/1987 | Lewis | 502/158 |

*Primary Examiner*—Anthony McFarlane
*Attorney, Agent, or Firm*—Robert Spector

[57] ABSTRACT

The storage stability of catalyst compositions comprising a platinum-alkenylsiloxane complex, an organopolysiloxane, and a microparticulate hydrophilic silica is substantially increased when the $pK_a$ of a dispersion containing specified amounts of said complex and said silica in a non-polar solvent is at least 2.0. The silica is treated with an alkaline material to achieve said $pH_a$ value.

10 Claims, No Drawings

PLATINUM-ALKENYLSILOXANE COMPLEX CATALYST COMPOSITION

REFERENCE TO CO-PENDING APPLICATIONS

This application is a continuation-in-part of copending application Ser. No. 056,821, filed on June 2, 1987 now abandoned.

BACKGROUND OF THE INVENTION

1. Field of the Invention

The present invention relates to a platinum/alkenylsiloxane complex catalyst composition that is a useful hydrosilylation reaction catalyst. More particularly, the present invention relates to an improved platinum-alkenylsiloxane complex catalyst composition for which the catalytic activity of the platinum-alkenylsiloxane complex does not change during longterm storage of the composition.

2. Description of the Prior Art

The hydrosilylation reaction involves addition of an organohydrogensiloxane across an unsaturated bond, for example, a carbon-to-carbon double bond. Compared with peroxide-based curing reactions and curing reactions involving the condensation of silicon-bonded hydrolyzable groups with silanol groups, the hydrosilylation reaction offers the advantages of a relatively rapid curing rate and no reaction by-products. As a consequence, it is widely utilized as the curing reaction in curable organopolysiloxane compositions.

Various transition metal compounds are known in the art as catalysts of hydrosilylation reactions, platinum compounds being the most widely utilized class of catalysts. Among these platinum compounds chloroplatinic acid-alkenylsiloxane complexes are known to have high catalytic activity (for example, refer to U.S. Pat. No. 3,419,593, which issued to Willing on Dec. 31, 1968).

Also known are catalyst compositions in the form of pastes prepared by blending an organopolysiloxane and microparticulate hydrophilic silica together with a chloroplatinic acid-alkenylsiloxane complex. These paste compositions are widely used because they are easy to add and blend into curable organopolysiloxane compositions and thus are easy to use.

A shortcoming of platinum-alkenylsiloxane complexes is their relatively poor stability. These platinum present in these compositions readily converts to finely divided platinum metal (platinum black) with a resulting decline in catalytic activity. In particular, compositions containing both microparticulate hydrophilic silica and a platinum-alkenylsiloxane complex suffer from the problem of a substantial decrease in catalytic activity with time, as determined by the time required to cure a specified organosiloxane composition comprising a vinyl-substituted polyorganosiloxane and an organohydrogensiloxane.

The present inventor carried out various investigations in order to solve the problem of decreasing catalytic activity, and the present invention was developed as a result of these investigations.

The object of the present invention is to provide a composition comprising a finely divided silica filler and a platinum-alkenylsiloxane complex wherein the level of activity as a hydrosilylation reaction catalyst remains substantially constant as a function of time.

SUMMARY OF THE INVENTION

The objective of this invention is achieved by adjusting the acidity value ($pK_a$) of the silica used in a silica/platinum-alkenylsiloxane catalyst composition to a value such that a specified mixture of the catalyst and the microparticulate silica dispersed in a non-polar liquid has a $pK_a$ value of at least 2.0. This value is preferably from 2.0 to 9.0.

DETAILED DESCRIPTION OF THE INVENTION

This invention provides an improved platinumalkenylsiloxane complex catalyst composition comprising
(A) 100 parts by weight of an organopolysiloxane,
(B) from 1 to 100 parts by weight of a microparticulate hydrophilic silica, and
(C) from 0.0001 to 100 parts by weight, as atomic platinum, of a platinum-alkenylsiloxane complex.

The improvement that characterizes the present catalyst compositions in the $pK_a$ value of a dispersion consisting essentially of 100 parts by weight of said silica, from 10 to 100 parts by weight, calculated as atomic platinum, of said complex, and a non-polar solvent. The $pK_a$ value is at least 2.0 and is achieved by treatment of said silica with an alkaline material.

The $pK_a$ value exhibited by prior art forms of finely divided silica under the conditions described for the present invention is typically less than 2.0. The inventive features of the present catalyst compositions resides in the presence of a finely divided silica that has been treated with an alkaline material to increase its $pK_a$ value. Data in the accompanying examples demonstrate that the catalytic activity of compositions comprising a platinum-alkenylsiloxane complex and a finely divided silica that has not been previously treated with an alkaline material as described hereinabove will decrease during storage, as determined an increase in the time interval required to initiate curing of a specified mixture of an ethylenically unsaturated polyorganosiloxane and an organohydrogensiloxane. By comparison, the catalytic activity of the present compositions remains substantially constant during storage.

The organopolysiloxane ingredient of the present compositions, referred to hereinafter as ingredient (A) serves to make the platinum-alkenylsiloxane complex, ingredient (C), easy to use in addition to serving as a stability improver and diluent for ingredient (C).

Ingredient (A) can be any of the organopolysiloxanes known in the art. The molecular configuration of this ingredient can be straight chain or branched chain so long as the ingredient has the siloxane-chain skeleton. Other than the oxygen atoms forming part of the siloxane bond and the absence of silicon bonded hydrogen atoms, there is no particular restriction on the groups bonded to silicon in said organopolysiloxanes. These groups include but are not limited to alkyl radicals such as methyl, ethyl, propyl, and n-octyl; alkenyl radicals such as vinyl and allyl; aryl radicals groups such as phenyl and naphthyl; cycloalkyl radicals such as cyclohexyl and cycloheptyl; haloalkyl radicals such as 3-chloropropyl and 3,3,3-trifluoropropyl; aralkyl radicals such as 2-phenylethyl and 2-phenylpropyl; and organofunctional groups which are bonded through divalent hydrocarbon radicals, for example, gamma-glycidoxypropyl and gamma-methacryloxypropyl.

The molecular weight of ingredient (A) is not specifically restricted, and may range from that of the dimer up to molecular weights in excess of 1,000,000. Furthermore, the organopolysiloxane may be used in the form of the mixture of two or more species.

From the standpoint of the relevant properties, the fluid organopolysiloxanes, ranging from liquids up to gums, are preferred. Among these, organopolysiloxanes having at least 2 silicon-bonded alkenyl groups in each molecule and also having a degree of polymerization of 10 or less are preferred because such organopolysiloxanes have a substantial effect in improving the stability of platinum-alkenylsiloxane complexes.

The microparticulate silica filler, referred to herein as ingredient (B), imparts a suitable consistency or thixotropy to the present catalyst compositions. The filler serves to provide a suspension, paste or plastic material, thereby providing the catalyst composition in an easy-to-use form. When the present catalyst composition is used to catalyze a composition with a substantial concentration of a non-siloxane component, ingredient (B) also facilitates mixing.

Microparticulate silicas can generally be divided into two types based on the method of production. One type is that silica known as fumed silica or dry-method silica, which is produced by the reaction of tetrachlorosilane in an oxyhydrogen flame. The other type of silica is referred to as wet-method silica, and is produced by reacting sodium silicate, also referred to as water glass, with acid and then removing the water and salt. Both dry-method and wet-method silicas can be used in the present invention. Wet-method silica is in general to be preferred because its use provide a more stable composition of the present invention.

Ingredient (B) is present at a concentration of from 1 to 100 parts by weight per 100 parts by weight of ingredient (A). Less than 1 part by weight is undesirable because the catalyst composition will not have the form of a suspension, paste or plastic, and thus will not be easy to use. Exceeding 100 parts by weight of silica is undesirable because a homogeneous mixture with ingredient (A) cannot then be obtained. As discussed hereinabove the silica must be treated with an alkaline material before it can be used in the present catalyst compositions. Untreated silicas typically exhibit a $pK_a$ value of less than 2.0, under the conditions described hereinbefore, making them too acidic for use in the present compositions.

The platinum-alkenylsiloxane complex, referred to herein as ingredient (C) is the hydrosilylation reaction catalyst. This ingredient is a platinum complex in which an alkenyl-substituted siloxane is coordinated with platinum. Platinum-alkenylsiloxane complexes are described, for example, in U.S. Pat. No. 3,419,353, which issued to Willing on Dec. 31, 1968, however the present catalyst compositions can contain any platinum complex which has been produced by the reaction of a haloplatinic acid or a haloplatinate salt with an alkenylsiloxane and which also is catalytically active in the hydrosilylation reaction.

The structure of the alkenylsiloxane starting material for ingredient (C) is not specifically restricted. This reactant preferably contains at least 2 alkenyl groups in each molecule. Most preferably the alkenyl groups are bonded to 2 silicon atoms that are, in turn, bonded to the same oxygen atom, because this will improve the stability of the obtained platinumalkenylsiloxane complex itself.

The concentration of ingredient (C) is from 0.0001 to 100 parts by weight, calculated as atomic platinum, per 100 parts by weight of ingredient (A). A catalytic effect in the hydrosilylation reaction is essentially absent at concentrations below 0.0001 parts by weight, while a homogeneous mixture with ingredients (A) and (B) cannot be obtained when the concentration of ingredient (A) exceeds 100 parts by weight.

The unique feature that characterizes the present compositions is their acid strength, expressed as a $pK_a$ value. This value is greater than 2.0 and is measured using a dispersion of ingredients (B) and (C) in a nonpolar solvent. The dispersion contains 100 parts by weight of ingredient (B) and 10 100 weight parts, as atomic platinum, of ingredient (C). The activity of the present compositions as hydrosilation catalysts will substantially decline when the $pK_a$ falls below 2.0. A $pK_a$ value of less than 9.0 is preferred, for the reason that the catalytic activity of some of the present compositions will decline slightly during storage when the $pK_a$ value, measured as described hereinbefore, exceeds 9.0. As disclosed in the preceding specification, catalytic activity is defined as the time interval required to initiate curing of a specified organosiloxane composition under a given set of reaction conditions.

Measurement of the $pK_a$ value in a nonpolar solvent is a necessary condition in the present invention. While the acid strength of silica is usually measured using an aqueous dispersion or a water-alcohol mixed solvent as the dispersion vehicle, the essential condition on the composition of the present invention cannot be determined from such measurement methods.

While it is true that platinum-alkenylsiloxane complexes are not miscible with water or water-alcohol mixtures, the reason for measuring the $pK_a$ value in a non-polar solvent is that this value measured in water or water-alcohol mixtures does not correlate with the storage stability of platinumalkenylsiloxane complexes in the presence of both the organopolysiloxane and silica ingredients of the present compositions.

As used herein the term "non-polar" denotes the absence of dissociable, active hydrogen atoms. Aromatic hydrocarbons such as benzene and toluene and saturated hydrocarbons such as cyclohexane and n-heptane are solvents which satisfy this condition. Benzene or cyclohexane are optimal for conducting definitive measurements.

The $pK_a$ value is not measured using an actual catalyst composition of this invention, but rather is measured on the dispersion in a nonpolar solvent of the microparticulate hydrophilic silica and platinum-alkenylsiloxane complex. Also, the weight ratio in which ingredients (B) and (C) are present for measurement of the $pK_a$ value is different from the ratio in which these components are present in the catalyst compositions of this invention.

The $pK_a$ value is measured using from 10 to 100 parts by weight of ingredient (C), expressed as atomic platinum, and 100 weight parts of silica, ingredient (B). When the quantity of ingredient (C) in compositions used to determine $pK_a$ values is less than 10 parts by weight, based on atomic platinum, a correlation between $pK_a$ values and storage stability, i.e. retention of catalytic activity during storage, of the actual catalyst composition of this invention cannot be made. Even if the $pK_a$ value falls within the preferred range of from 2.0 to 9.0 the hydrosilylation catalytic activity of the platinum-alkenylisloxane complex in the actual composition will still decline with time.

The acid strength of the present composition is expressed in terms of their $pK_a$ values. These values encompass not only the acid region, but also the alkaline region at $pK_a$ values greater than 7.0.

The range within which the acid strength of a given catalyst composition lies can be determined from the color of indicators, that is, 2-amino-5-azotoluene can be used as an indicator with a transition $pK_a$ value of 2.0, and Thymol blue can be used as an indicator with a transition $pK_a$ value of 9.0. The acid strength is determined by the addition of several drops of a solution containing from 0.05 to 0.1 weight % of the indicator.

When more exact $pK_a$ measurements are desired, a narrowrange mixed indicator and the visible absorption spectrum can be used in combination. However, the object of the present invention is satisfactorily achieved using the aforementioned less precise method for range determination.

The catalyst composition of this invention can be prepared by mixing the organopolysiloxane, ingredient (A), the microparticulate hydrophilic silica ingredient (B) and the platinum-alkenylsiloxane complex, ingredient (C).

The order of mixing, mixing temperature, mixing pressure, and shear conditions are not specifically restricted.

The $pK_a$ value of a dispersion of ingredient (B) and untreated silica measured under the conditions described in this specification is less than 2.0. The silica must therefore be treated with an alkaline material in order to raise the $pK_a$ above this critical minimum value. Treatment of the silica can be accomplished by addition of an alkaline material as a fourth ingredient to the composition in which the $pK_a$ value is determined. Alternatively, the microparticulate silica can be treated prior to being added to the composition in which the $pK_a$ value is measured. Alkaline materials that can be used to treat the silica using either of the aforementioned treating procedures include but are not limited to alkali metals, alkaline earth metals, and calcium salts of higher aliphatic carboxylic acids.

Specific examples of alkaline materials that can be added to the compositions used to determine $pK_a$ values are alkali metal siloxanes such as potassium silanolate and sodium silanolate, and alkali metal alcoholates such as potassium butoxide and sodium ethoxide.

As necessary, crepe-hardening inhibitors, non-organopolysiloxane polymers, organic solvents, crosslinking inhibitors, thermal stabilizers such as iron oxide and rare earth compounds, flame retardants such as manganese carbonate and fumed titanium dioxide, as well as quartz powder, diatomaceous earth, calcium carbonate, glass fiber, and carbon black, etc., can optionally be present in the catalyst compositions of this invention in addition to the aforementioned ingredients (A), (B) and (C) unless the additional ingredients adversely affect the object of the invention, specifically maintaining the catalytic activity of the present compositions during storage.

The silica/platinum-alkenylsiloxane complex catalyst compositions produced as described in this specification can be used in paste, plastic or dispersion form as a hydrosilylation reaction catalyst. Curable organosiloxane compositions containing the present catalyst compositions can be prepared by adding the catalyst composition to a mixture comprising (1) at least one organopolysiloxane having at least two ethlienically unsaturated hydrocarbon radicals, for example, alkenyl radicals, and (2) at least one organopolysiloxane having silicon-bonded hydrogen atoms.

The present catalyst compositions can also be used as curing catalysts for non-organopolysiloxane polymer compositions. Furthermore, the composition of the present invention can be used as a flame retardant for various silicone rubbers.

The following examples describe preferred embodiments of the present hydrosilation catalyst compositions, and should not be interpreted as limiting the scope of the invention described in the accompanying claims. Unless otherwise indicated, all parts and percentages are by weight and viscosity measurements were performed at 25 degrees C.

The acid strength ($pK_a$ values) of ingredients (B) and (C) dispersed in a nonpolar solvent were measured as follows:

Test samples were prepared by placing 0.1 g of the microparticulate hydrophilic silica to be evaluated and 5 cc of benzene in a test tube. A 0.5 g portion of a platinum-vinylsiloxane complex prepared as described in Reference Example 2 below was then added, and the contents of the tube were mixed to homogeneity. The $pK_a$ values of each of the tubes thus prepared were measured by observing the color produced upon addition of an indicator solution for $pK_a$ measurement. The concentration of the indicator solution was from 0.05 to 1.0% in benzene.

The quantity of addition of platinum-vinylsiloxane complex was assumed to be 0.5 g because it had been confirmed in the above procedure that the $pK_a$ value for any microparticulate silica reached a constant value following addition of at least 0.3 g of platinum-vinylsiloxane complex A. Also, the silica precipitated upon standing during the measurement procedure, and in some cases the solution had a different color from the precipitated silica. In these cases, the color of the precipitated silica was evaluated.

REFERENCE EXAMPLE 1

Adjustment of the $pK_a$ values of microparticulate hydrophilic silicas 30.0 g of wet-method silica (Nipsil LP from Nippon Silica Kogyo Kabushiki Kaisha) were dispersed in 500 g water and 200 cc of 0.1 N aqueous sodium hydroxide was added to raise the $pK_a$ of the silica above 2.0. The resultant mixture was stirred for one hour, after which it was filtered and then dried for 6 hours at 150 degrees C. The resulting solid cake was ground up and then passed through a 200 mesh filter to yield a microparticulate silica referred to as silica A in the following examples.

Silica B was prepared in an identical manner to silica A, but using 400 cc of 0.1 N aqueous sodium hydroxide.

Silica C was prepared by dispersing 30.0 g dry-method silica (Aerosil 200 from Nippon Aerosil Co., Ltd.) in 800 g water and then adding 150 cc of 0.1 N aqueous sodium hydroxide. The resultant mixture was stirred for one 1 hour, after which it was filtered and then dried at 150 degrees C. for 6 hours. The resultant solid cake was ground up and passed through a 200 mesh filter to obtain a microparticulate silica referred to hereinafter as silica C.

Silica D was prepared by adding 1.0 g calcium stearate as the alkaline material to 30.0 g wet-method silica (Nipsil LP from Nippon Silica Kogyo KK), followed by mixing to homogeneity by stirring for 1 day at room temperature. This mixture was then heated at 180 degrees C. for 2 hours.

Silica E was prepared by adding 1.0 g calcium stearate to 30.0 g dry-method silica (Aerosil 200 from Nippon Aerosil Co., Ltd.), followed by mixing to homogeneity by stirring for 1 day at room temperature. This mixture is then heated at 180 degrees C. for 2 hours.

Table 1 reports the results of $pK_a$ measurements on microparticulate hydrophilic silicas A–E in a nonpolar solvent in the presence of excess platinum-alkenylsiloxane complex. For comparison, Table 1 also reports the $pK_a$ values for microparticulate silicas whose $pK_a$ values had not been adjusted by the addition of alkaline materials.

TABLE 1

| microparticulate silica | $pK_a$ |
| --- | --- |
| silica A | 4.0–4.8 |
| silica B | 4.8–6.8 |
| silica C | 4.8–6.8 |
| silica D | 4.0–4.8 |
| silica E | 4.8–6.8 |
| Nipsil LP | 0.8–1.5 |
| Aerosil 200 | 0.8–1.5 |

REFERENCE EXAMPLE 2

Preparation of platinum-vinylsiloxane complex 160 g 1,3-divinyltetramethyldisiloxane was mixed with 32.0 g hexachloroplatinic acid ($H_2PtCl_6 \cdot 6H_2O$), and the mixture was heated with stirring at 120 degrees C. under a nitrogen current for 1 hour. The platinum black by-product was removed by filtration, and the acid was removed by washing with water to obtain a reaction product consisting of a platinum-vinylsiloxane complex. The platinum concentration in this reaction product was 4.25wt %.

EXAMPLE 1

Ten grams of a trimethylsiloxy-terminated polydimethylsiloxane having a viscosity of 0.02 Pa.s was mixed in each case with 1.0 g of silica A, B, C, D, or E, and for comparison with 1.0 g of Nipsil LP or Aerosil 200 (microparticulate silicas with unadjusted acid strengths). 8.4 mg of the reaction product obtained in Reference Example 2 was then added and the resultant mixture blended to homogeneity to yield a platinum-vinylsiloxane complex catalyst composition.

Curable organosiloxane compositions were prepared by blending 4.68 g of one of the catalyst compositions into a mixture composed of 20 g dimethylvinylsiloxy terminated polydimethylsiloxane having a viscosity of 12,000 cS, (12 Pa.s), 0.258 g methylhydrogensiloxane/-dimethylsiloxane copolymer having a viscosity of 20 cS (0.02 Pa.s) and containing 0.72 wt % of silicon-bonded hydrogen atoms, and 0.0058 g phenylbutynol as a catalyst inhibitor. A second portion of each of the catalyst compositions was stored for one month at a temperature of 50 degrees C. prior to being blended into the organosiloxane composition.

The time interval between blending of the reactants and initiation of the curing reaction was determined at 130 degrees C. by measuring the viscosity of the reaction mixture, using a Curastometer Model III from Toyo-Baldwin Kabushiki Kaisha. These results are reported as "Curing Start Time" in Table 2. The results demonstrate that the curing start times for the compositions containing silicas A–E were substantially unchanged from the initial value after the catalyst composition had been aged at 50 degrees C. for 1 month, whereas the time required to initiate curing of the compositions prepared using the two untreated silicas increased by a factor of at least 3 when the catalyst composition was aged for one month.

TABLE 2

| | Microparticulate Silica | Curing Start Time (Seconds) initial | after 1 month @ 50° C. |
| --- | --- | --- | --- |
| composition of the invention | silica A | 25 | 26 |
| composition of the invention | silica B | 25 | 26 |
| composition of the invention | silica C | 26 | 27 |
| composition of the invention | silica D | 25 | 27 |
| composition of the invention | silica E | 26 | 27 |
| comparison example | silica with unadjusted acid strength - Nipsil LP | 26 | 140 |
| comparison example | silica with unadjusted acid strength - Aerosil 200 | 25 | 85 |

EXAMPLE 2

Ten grams of a trimethylsiloxy-terminated polydimethylsiloxane having a viscosity of 0.02 Pa.s was mixed with either 1.0 g silica A produced as described in Reference Example 1, or with 1.0 g Nipsil LP. Two platinum-vinylsiloxane complex catalyst compositions were prepared by adding and mixing 8.4 mg of the reaction product of Reference Example 2 into each of the silica dispersions. 0.0026 g of each of the resultant catalyst compositions was then added to individual portions of an emulsified mixture of 20 g acyloxy-terminated polypropylene oxide having a viscosity of 4,100 cS (4.1 Pa.s), 1.08 g of the methylhydrogensiloxane-dimethylsiloxane copolymer described in Example 1, and 0.0058 g phenylbutynol, and the resultant compositions were mixed at high shear. A second set of compositions was prepared using the two aforementioned catalyst compositions after they had been aged at 50 degrees C. for 1 month.

The time required to initiate curing of the resulting mixtures was measured at 130 degrees C. as described in Example 1. These results are reported as "curing start time" in Table 3 and confirm that the catalyst compositions of this invention do not lose their activity as a hydrosilylation reaction catalyst, even for non-siloxane polymers, after aging at 50 degrees C. for 1 month.

TABLE 3

| | microparticulate silica used | curing start time (seconds) initial | after aging 1 month/50° C. |
| --- | --- | --- | --- |
| composition of the invention | silica A | 28 | 27 (transparent after curing) |
| comparison example | silica with unadjusted acid strength (Nipsil LP) | 29 | 350 (opaque after curing) |

The present catalyst compositions are characterized by excellent retention of catalytic activity during storage. The catalyst compositions are therefore useful for compositions that cure by reaction of an organohydrogensiloxane with either organosilicon or organic compounds.

That which is claimed is:

1. In a platinum-alkenylsiloxane complex catalyst composition comprising
   (A) 100 parts by weight of an organopolysiloxane,
   (B) from 1 to 100 parts by weight of a microparticulate hydrophilic silica, and
   (C) from 0.0001 to 100 parts by weight, as atomic platinum, of a platinum-alkenylsiloxane complex,
the improvement wherein said silica is characterized by a $pK_a$ value exhibited by a dispersion which consists essentially of 100 parts by weight of said silica, from 10 to 100 parts by weight, calculated as atomic platinum, of said complex, and a non-polar solvent, where said $pK_a$ value is at least 2.0, and is achieved by treatment of said silica with an alkaline material.

2. A catalyst composition according to claim 1 where said silica is (a wet method silica) produced by reacting sodium silicate with acid and subsequently removing the water and salt.

3. A catalyst composition according to claim 1 where said alkenylsiloxane and said organopolysiloxane are identical, contain at least two alkenyl groups per molecule and have a degree of polymerization no greater than 10.

4. A catalyst composition according to claim 3 where said alkenylsiloxane is a divinyltetraalkyldisiloxane.

5. A catalyst composition according to claim 4 where said alkenylsiloxane is divinyltetramethyldisiloxane.

6. A catalyst composition according to claim 5 where said catalyst composition contains a liquid trimethylsiloxy terminated polydimethylsiloxane.

7. A composition according to claim 1 where said nonpolar solvent is an aromatic hydrocarbon.

8. A composition according to claim 7 where said aromatic hydrocarbon is benzene.

9. A composition according to claim 1 where said alkaline material is selected from the group consisting of an alkali metal hydroxide, an alkali metal silanolate, an alkaline earth metal hydroxide, an alkaline earth metal silanolate, calcium stearate, and an alkali metal alcoholate wherein the $pK_a$ of said composition is less than 9.0.

10. A composition according to claim 9 where the silica treating agent is sodium hydroxide or calcium stearate.

* * * * *